July 24, 1956 S. A. STAEGE ET AL Re. 24,185

PAPER MACHINERY

Original Filed Oct. 14, 1950 3 Sheets-Sheet 1

Inventors

STEPHEN A. STAEGE &
JOHN H. PEARSON

By

Moreschal & Biebel

ATTORNEYS

PAPER MACHINERY

Original Filed Oct. 14, 1950 3 Sheets-Sheet 2

Inventors

STEPHEN A. STAEGE &
JOHN H. PEARSON

By

Marechal & Biebel
ATTORNEYS

Inventors

STEPHEN A. STAEGE &
JOHN H. PEARSON

By

Marechal & Biebel

ATTORNEYS

United States Patent Office

Re. 24,185
Reissued July 24, 1956

24,185

PAPER MACHINERY

Stephen A. Staege, Hamilton, and John H. Pearson, Middletown, Ohio, assignors to The Black-Clawson Company, Hamilton, Ohio, a corporation of Ohio Original No. 2,666,368, dated January 19, 1954, Serial No. 190,184, October 14, 1950. Application for reissue March 7, 1955, Serial No. 492,820

21 Claims. (Cl. 92—27)

Matter enclosed in heavy brackets [ ] appears in the original patent but forms no part of this reissue specification; matter printed in italics indicates the additions made by reissue.

This invention relates to apparatus for controlling the refining action of jordans and like refiners which include a tapered plug or like refining member.

The invention has particular relation to apparatus for controlling the refining action of such a refiner by adjusting the axial position of the plug in the shell in accordance with the desired spacing of the relatively moving working surfaces of the plug and shell, and one of the principal objects of the invention is to provide control apparatus for this purpose in the form of a simple and self-contained unit which is adapted for mounting directly on the frame of the refiner, which includes both a motor and a manually operated drive for the plug adjusting parts, and which is adapted for direct connection with the operating circuits of the refiner for selectively automatic or manual operation to maintain predetermined load conditions on the drive motor by adjusting the plug in accordance with the desired characteristics in the refined stock.

The invention also makes special provision for the protection of the refiner against damage resulting from causes such as failure of the stock flow or stoppage of the refiner motor when the control apparatus is set for automatic operation. These safety features are provided by means of switches so connected in the operating circuits that the plug is automatically backed off to increase its clearance in the shell in the event of either stoppage of the refiner motor or loss of pressure in the stock supply below a desired range, thus preventing damage to the refiner which might otherwise result from movement of the plug inwardly of the shell. Another feature of the invention giving additional protection to the refiner is the provision of a selective time control for backing the plug out of the shell following completion of a batch refining operation, this control being effective to cause the adjusting motor to operate for a timed interval assuring adequate clearance to prevent damage to the refiner motor at the start of the next batch operation.

The invention has special application to the control of a refiner in a stock supply system for a high speed paper machine, where unless changes in the stock characteristics are promptly corrected or compensated for, the formation of the web or sheet may be seriously affected. With the control apparatus of the present invention, not only is the plug adjusted automatically in the event of change in the characteristics of the stock causing variation in the load on the refiner motor, but the apparatus also is provided with manually operable controls which may be located at a convenient station such as for operation by the machine tender, who can thus effect prompt correction of a change in the stock characteristics causing variation in the reading of the usual vacuum gauge for the suction couch roll. It is also an object of the invention to provide for automatic adjustment of the desired maintained load on the refiner motor in accordance with changes in the suction conditions at the suction couch roll as registered by the vacuum gauge.

Another advantageous feature of the invention is of particular importance for installations where variation may occur in the voltage or power factor as supplied to the refiner motor. When the control apparatus in such an installation is actuated by a current sensitive control, it may be operated as a result of variation in the voltage or power factor when in fact the characteristics of the stock itself have not changed. Accordingly it is an object of the invention to provide the control apparatus for use with a watt sensitive control of such high sensitivity as to maintain the desired adjusted position of the plug in accordance with the actual power requirements of the refiner motor for desired refining characteristics while at the same time preventing variation in the voltage supply or power factor from undesirably affecting the adjustment or operation of the refiner.

Other objects and advantages of the invention will be apparent from the following description, the accompanying drawings and the appended claims.

In the drawings—

Figure 1:
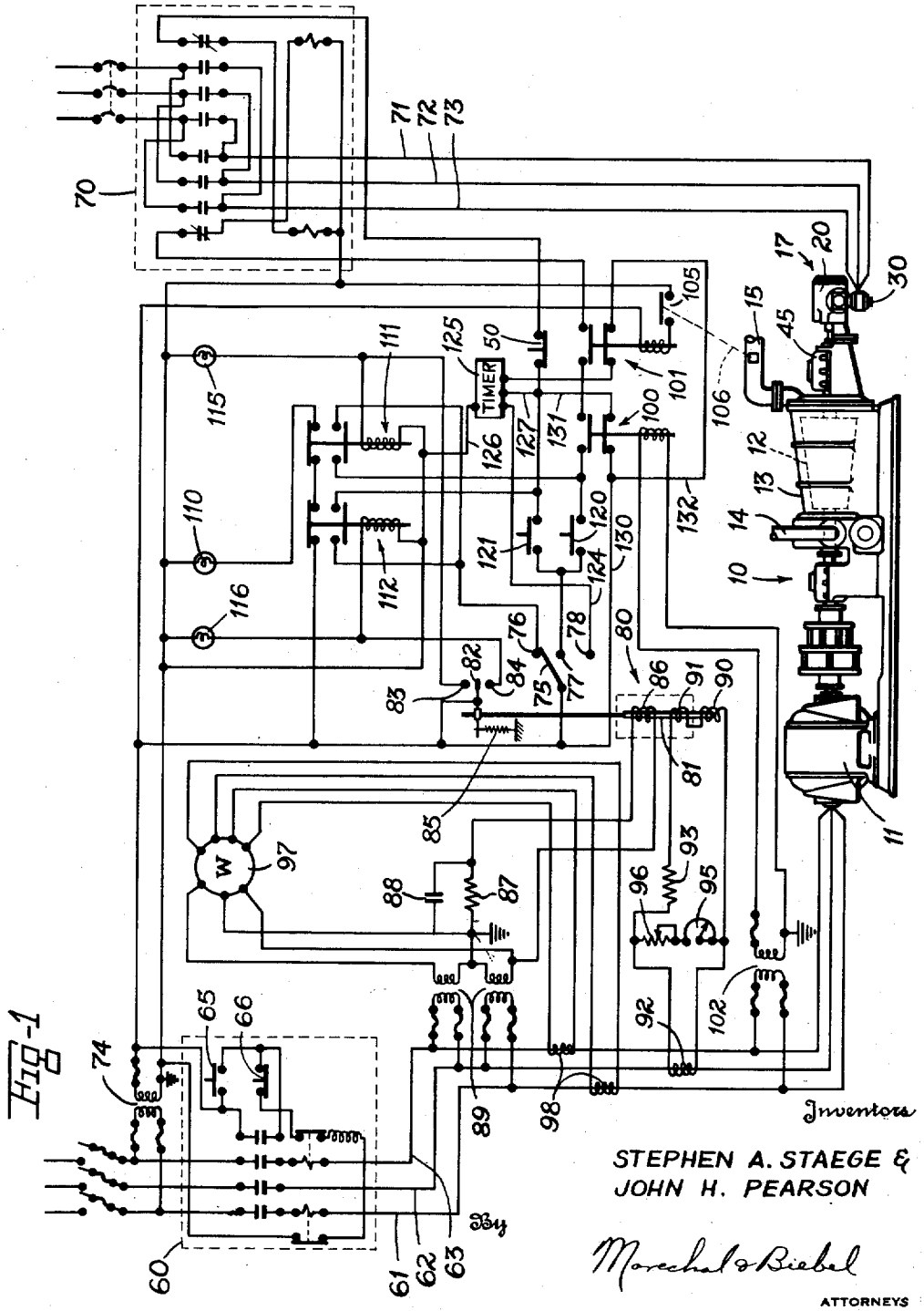
Fig. 1 is a wiring diagram illustrating the operation of the contral apparatus of the invention in conjunction with a jordan type refiner and a watt sensitive control relay.
Figure 2:
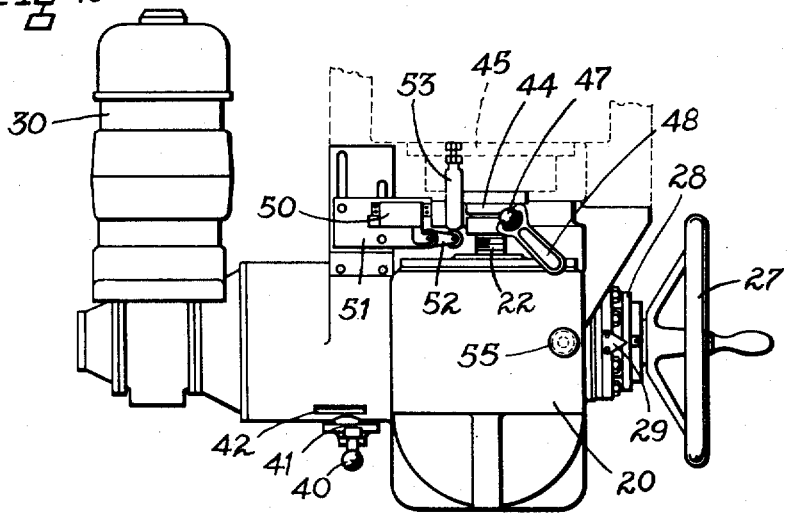
Fig. 2 is a plan view of the control unit of the invention.
Figure 3:
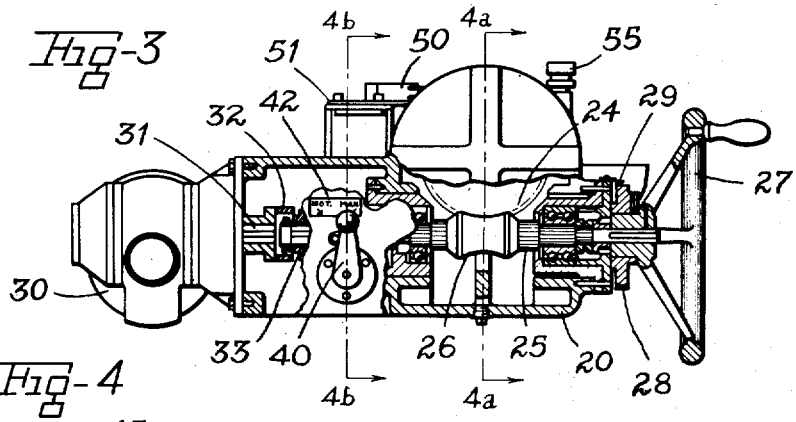
Fig. 3 is a front view of the unit, partly in elevation and partly broken away in vertical section.
Figure 4:
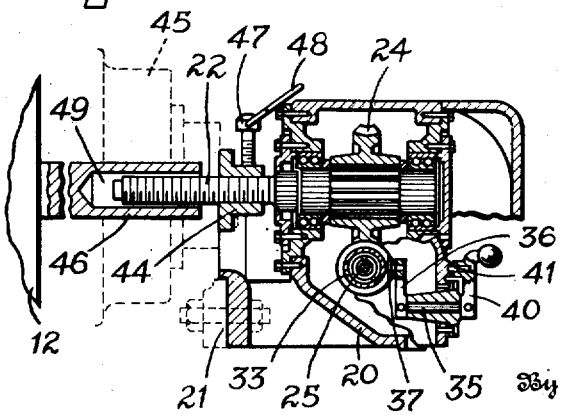
Fig. 4 is a sectional view chiefly on the line *4a—4a* of Fig. 3 and with the clutch portion in section on the line *4b—4b* of Fig. 3.

Referring to the drawings, which illustrate a preferred embodiment of the invention, Fig. 1 shows a somewhat schematic arrangement of the wiring diagram for a refiner 10 of the jordan type which is provided with a drive motor 11 for rotating the plug 12 in a shell 13 having inlet and discharge pipes 14 and 16 respectively. The axial position of the plug in the shell is controlled by the adjusting unit indicated generally at 17 and shown in detail in Figs. 2 to 4, and which includes a housing 20 adapted to be mounted directly on the frame of the refiner 10, as indicated at 21 in Fig. 4.

The adjusting screw 22 for the plug is journaled in suitable bearings in the housing and projects therefrom for connection to the plug shaft, and a worm gear 24 is splined thereon within the housing 20. A shaft 25 is also journaled within housing 20 in suitable bearings and carries a worm 26 which meshes with the worm gear 24. The shaft 25 extends outwardly at one side of housing 20 to receive the hand wheel 27 for manual rotation, and the hand wheel carries an indicator band 28 which cooperates with a pointer 29 on the housing to indicate the extent of rotation of shaft 25.

A motor 30, shown as of the gear head type, is mounted on the end of housing 20 opposite the hand wheel 27, and it drives a shaft 31 carrying one member 32 of a clutch, shown as a multiple disk clutch. A complementary clutch member 33 is splined on the end of shaft 25 for selective engagement with clutch member 32 to effect motor driving of shaft 25. The clutch operating shaft 35 extends through the side of housing 20 and carries a lever 36 having a shoe 37 which rides in a peripheral groove in the clutch member 33 and is effective to shift this clutch member into and out of engagement with clutch member 32 as the clutch shaft 35 is rocked in one direction or the other. A handle 40 is mounted on the outer end of shaft 35 and is provided with a detent 41 for releasably holding it in either of two selected positions retaining the clutch members in engagement for automatic operation or out of engagement for manual operation of the control unit, as indicated by the indicia plate 42.

The outer end of the adjusting screw 22 is threaded through the thrust nut 44 which is bolted or otherwise secured to the bearing unit 45 for the plug shaft 46. A lock screw 47 having a handle 48 provides for releasably locking the thrust nut to the adjusting screw when desired. The bearing unit 45 is secured against axial movement with respect to the plug shaft 46 for movement therewith with respect to the shell 13 to adjust the position of the plug within the shell, the outer end of the shaft 46 having a bore 49 therein to receive the end of the adjusting screw 22 in telescoping relation.

It will thus be seen that rotation of the screw 22 will result in axial movement of the bearing unit 45 and hence of the plug and plug shaft to provide the desired variation in clearance between the working surface of the plug and shell, and the gearing and threaded connection of the screw 22 are preferably arranged to provide for relatively slow adjusting movement of the plug, for example axial movement of the order of ¼ inch per minute having been found satisfactory. A limit switch 50 for motor 30 is mounted on the housing 20 by means of a bracket 51, and is arranged to limit operation of the motor in the direction causing the plug to back off from the shell. The operating arm 52 for switch 50 is adapted to be contacted by a pin 53 projecting from the bearing unit 45 towards housing 20. The lubricating inlet to the housing has a breather cap 55.

Fig. 1 shows a wiring diagram for operating the control unit 17 in accordance with the wattage load on the drive motor 11 for the refiner 10. The motor 11 has a main starter indicated generally at 60, the motor 11 being of the 3-phase type and having power lines 61, 62 and 63, and the starter 60 includes the usual start and stop push button switches 65 and 66, respectively, together with overload and time interlocked relays. The motor 30 is similarly shown as of the 3-phase type provided with a reversing magnetic switch 70 and power lines 71, 72 and 73. Power for operation of the control circuit for motor 30 is provided by a step-down transformer 74 from the lines 61 and 63, and the control circuit includes a three-position manually operable selector switch 75 for selecting manual or automatic operation of the control unit, the switch 75 having contacts 76, 77 and 78.

Fig. 1 shows the switch 75 shifted to its contact 76 for automatic control of the refiner by means of a watt sensitive relay indicated generally at 80, which includes a movable armature 81 carrying a switch arm 82 movable between upper and lower contacts 83 and 84 and an intermediate neutral position, with the arm 82 and core 81 being provided with a balancing spring 85. The relay 80 also includes a voltage coil 86 which is wound around the armature 81 but is fixed in stationary relation with the contacts 83 and 84 so that the armature moves with respect thereto. This coil 86 is connected with a parallel circuit comprising a resistor 87 and a capacitor 88, and this combination is connected across the terminals of one of a pair of potential transformers 89 connected with all three power lines 61—63 as shown, the resistor-capacitor circuit being used to compensate for the highly reactive potential coil 86.

A current coil 90 is wound around the armature 81 for movement therewith with respect to the potential coil 86, and a current compensating coil 91 is also wound around the armature 81 but is fixed in stationary relation with the contacts 83 and 84 and the potential coil 86, the coil 91 being used to counteract the inductive effect of the potential coil 86 on the current coil 90. The coils 90 and 91 are connected with the power line 62 by a current transformer 92, and a fixed resistor 93 is provided for preventing the coils 90 and 91 from burning out due to their low ohmic value.

A rheostat 95 provides for controlling the current through coils 90 and 91 in accordance with the desired input power to motor 11 to be maintained for a given refining operation, and an adjustable resistor 96, such as a slide wire resistor, is connected in a series with the rheostat [90] *95* and is adapted to be preset in accordance with the maximum load to be held on the particular motor 11 with which the control unit is to be used. Thus with the relay arranged and connected as shown, the position of the armature 81 with respect to coils 86 and 91, and hence the position of the switch arm 82 with respect to the contacts 83 and 84, will be a function of the watts supplied to the refiner motor 11. A wattmeter 97 is also provided, with connections as shown to the potential transformers 89 and to the power lines 61 and 63 by current transformers 98.

Two safety devices 100 and 101, shown as magnetic switches, are provided to prevent damage to the plug in the event of either stoppage of the refiner motor or failure of the stock pressure as supplied to the refiner. The switch 100 comprises a relay having its operating coil connected with the power lines 61 and 63 by a step-down transformer 102, so that this relay is energized only while the motor 11 is in operation. The switch 101 comprises a similar relay having its operating coil connected across the control circuit through the transformer 74, and the circuit for this coil includes a pressure switch 105 having a pressure connection 106 with the inlet or discharge pipe for the refiner, shown as the discharge pipe 15, with this connection being arranged to maintain the switch 105 closed only when the proper pressure exists in the system through the refiner.

With the switch 75 set for automatic operation, as long as a constant load condition on the motor 11 continues, a signal light 110 is lighted through the upper pairs of contacts of two normally deenergized relays 111 and 112, the light 110 being conveniently white and indicating maintenance of constant load conditions. However, in the event of a change such as a variation in the consistency or freeness of the stock in the system through the refiner, there will be a corresponding variation in the work being done on the stock in the refiner and hence in the load conditions on the refiner motor 11. When this occurs, it is reflected by variation of the conditions affecting relay 80, resulting in upward or downward movement of the armature 81 and hence of the switch arm 82 with respect to the contacts 83 and 84.

When the switch arm 82 engages the upper contact 83, the proper circuits will be completed through reversing switch 70 to effect energizing of the motor 30 in the proper direction to cause the plug 12 to move inwardly of the shell 13, which is the proper adjusting movement for the plug when there is a decrease in the load on refiner motor 11 as indicated by the relay 80 resulting from decrease in the consistency or freeness of the stock as supplied to the refiner. When the switch arm 82 engages the contact 83, the relay 111 will be energized to complete the circuit through its lower pair of contacts to the switch 70, this circuit running through contact 76 of the switch 75 and the upper pair of contacts of each of the relays 100 and 101. The motor 30 will accordingly operate until the resulting changed setting of the plug increases the load on the refiner motor sufficiently to restore the desired load condition. Also, energizing of the relay 111 breaks the circuit through its upper contacts to the signal light 110, and at the same time a circuit is completed through the contact 83 to a signal light 115 which may be conveniently red, and this light remains on as long as the motor 30 is in operation in the direction to move the plug inwardly of the shell.

When there is an increase in the load on the refiner motor 11 effective on the relay 80 to cause movement of the armature 81 until the switch arm 82 engages the lower contact 84, the proper circuits will be completed through the switch 70 for energizing motor 30 in the opposite direction from that described, thus causing the plug 12 to back off from the shell 13. This produces increased clearance between the working surfaces of the plug and shell, which is necessary in order to maintain the same load conditions on the refiner motor with increased consistency or freeness in the stock. Engagement of the switch arm 82 and contact 84 completes the energizing circuit for the relay 112, and this in turn completes the circuit through the lower pair of contacts of this relay to the switch 70, this circuit running through the contact 76 of the switch 75 and the limit switch 50.

Under these conditions, the motor 30 will operate until the resulting changed setting of the plug reduces the load on the refiner motor 11 sufficiently to restore the desired load condition effective on the relay 80, or until the plug has backed off so far that the pin 53 engages the switch arm 52 and opens the limit switch 50. During this operation of the motor, a third signal light 116 will be lighted by a circuit completed through the contact 84 as shown, this light being conveniently green, and the light 110 will be off as a result of the breaking of the circuit thereto through the upper contacts of relay 112 when the latter is energized. The light 115 will similarly be off owing to the fact that there is no circuit through the contact 83.

Push button switches are provided for manual operation of the control when the switch 75 is shifted to its contact 77. The push button switch 120 completes the circuit through switch 70 for movement of the plug inwardly of the shell, and alternatively the push button switch 121 may be closed to cause the plug to back off as described. It will also be noted that with the circuit set for manual operation, the several signal lights will operate in the same manner as described for automatic control.

When the jordan or other refiner is used for a batch refining operation, it is desirable at the end of the operation to back the plug out of the shell a sufficient distance to prevent overloading the refiner motor at the start of the next operation, since if there is insufficient clearance for the plug when the refiner is again started, the resulting high starting torque may burn out the motor. However, since the gearing for the motor 30 is such that the motor is required to run for an appreciable time interval in order to move the plug a sufficient distance, it may be inconvenient for the operator to have to hold the push button switch 121 closed for a long enough time. Accordingly, a timing circuit is provided through the contact 78 of the selector switch 75 which effects this desired backing off movement of the plug for the proper time interval.

As shown, the contact 78 is connected through a line 124 with a timer 125, which may be of a conventional motor driven cam type, and a line 126 completes the energizing circuit for the timer motor. A line 127 leads from the timer to the circuit through the reversing switch 70 for energizing motor 30 in the direction to back the plug, and the action of the timer when energized through the switch contact 78 is to cause motor 30 to operate for a preset time interval sufficient to back the plug out until the desired clearance is obtained and then to stop. The timer is reset when the switch 75 is shifted to either of its contacts 76 or 77, at which time the motor 30 can be operated in the opposite direction, either automatically or through the push button switch 120, to move the plug inwardly of the shell to the proper setting in accordance with the desired load conditions on the refiner motor.

It will be seen that unless the proper provision is made, stoppage of the refiner motor or failure of the stock pressure would so affect the relay 80 as to actuate motor 30 in the direction to move the plug inwardly, which could result in serious damage to both the plug and shell. Accordingly, the safety switches 100 and 101 are provided to prevent this undesirable result and to cause the plug to back off instead of moving in under either of these conditions. Thus if the refiner motor should stop, the resulting movement of the armature 81 would complete the circuits as described for inward movement of the plug. However, as soon as the refiner motor stops, the relay 100 will be deenergized, with the result that the circuit through its upper pair of contacts will be broken, and instead a circuit will be completed through the line 130, the lower pair of contacts of relay 100, and the line 131 to the switch 70 energizing motor 30 in the opposite direction and causing the plug to back off until the limit switch 50 is opened.

The operation of the safety switch 101 is similar to that of switch 100 as described. If the stock pressure fails, the resulting decrease in the load on the refiner motor affects the relay 80 sufficiently to move the armature 81 until the switch arm 82 engages contact 83 to energize switch 70 in the proper sense to cause motor 30 to move the plug inwardly. However, upon failure of the stock pressure, the pressure switch 105 will open and thus cause deenergizing of the relay 101. This in turn will break the circuit to the switch 70 through the upper pair of contacts of relay 101 and will instead complete the reverse circuit to the starter through the line 130, the line 132, the lower pair of contacts of relay 101, the line 132 to the timer 125 and the line 127. Thus under either of these conditions which would otherwise cause inward movement of the plug, the safety switches automatically operate instead to cause the plug to back off and thus assure against damage thereto, and this result will be obtained under both automatic and manual operation of the control system.

It will accordingly be seen that with the control circuits arranged as described for automatic operation, the refiner plug will be adjusted as required to maintain the load conditions on the refiner motor determined by the selected setting of the rheostat 95. The invention also provides for further automatic adjustment of the refining action of the refiner such as may be required to maintain constant conditions of web formation on the associated paper machine, with this control being effected in accordance with changes in the web conditions as registered by the vacuum gauge for the suction couch roll or suction boxes. This desired control is afforded by automatic adjustment of the load regulating rheostat to compensate for variations in the suction conditions as registered by the vacuum gauge, and Fig. 5 illustrates suitable control circuits in accordance with the invention for this purpose.

Figure 5:
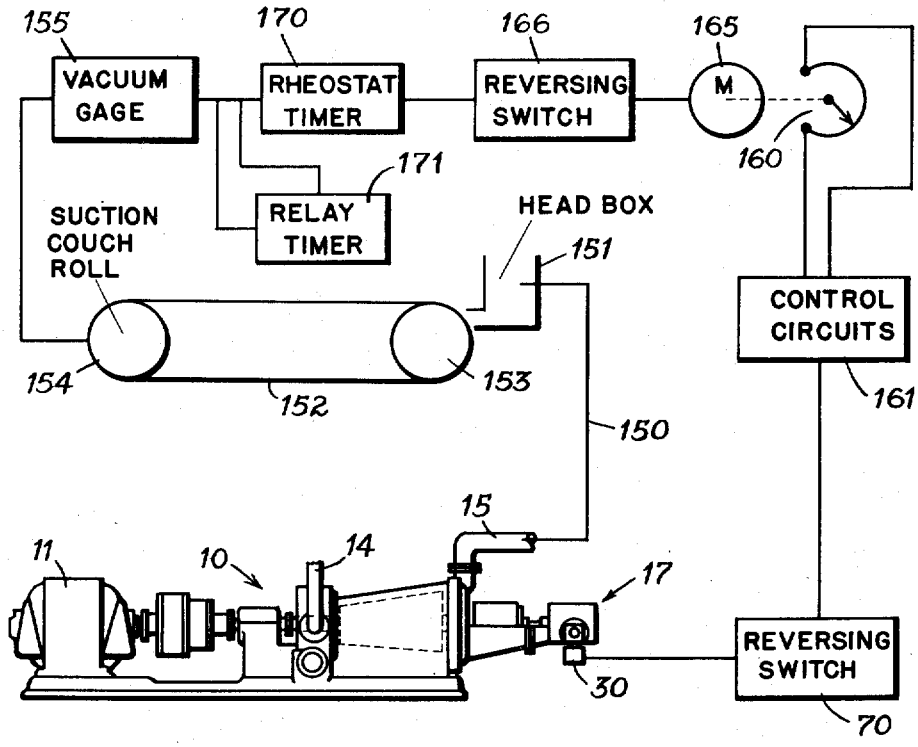
Fig. 5 is a schematic wiring diagram illustrating the operation of the invention with the load on the refiner motor adjusted by the vacuum gauge for the suction couch roll of the paper machine.

In Fig. 5, the discharge pipe 15 of the refiner 10 is shown at 150 as supplying the refined stock to the headbox 151 of a fourdrinier paper machaine which includes the forming wire 152 running over the breast roll 153, and the suction couch roll 154 is provided with a vacuum gauge 155. The rheostat 160 corresponds to rheostat 95 in Fig. 1, and the several control circuits of Fig. 1, are represented diagrammatically at 161 and operate as described to control the reversing switch 70 for the plug adjusting motor 30.

The rheostat 160 is provided with a reversible adjusting motor 165 controlled by a reversing switch 166 which is arranged for selective actuation in response to fluctuations of the vacuum gauge 155 from its desired setting, for example by means of stationary contacts cooperating with a movable contact carried by the moving indicator member of the gauge, with the contacts being adjustable to complete the actuating circuit to the switch 166 when the vacuum changes from its desired value by a predeterminde amount such as 0.1 inch of mercury. Thus if the stock characteristics should change sufficiently to cause a measurable change in the suction conditions at the couch roll 154 without accompanying change in the load on the refiner motor 11 sufficient to actuate the control relay 80, the switch 166 will be energized to operate motor 165 and change the setting of the rheostat 160, which will in turn actuate the control circuits 161 to drive the plug adjusting motor 30 as described.

There will be an appreciable time interval before the change in the stock characteristics at the refiner caused by the resulting adjusting movement of the plug will register at the vacuum gauge, depending on conditions such as the distance through which the stock travels from the refiner to the suction couch, and the velocity of the stock flow and the paper machine, and a timer 170 is accordingly provided in the circuit between the vacuum gauge and the switch 166 to limit the operating interval of the motor 165. In order to prevent too frequent actuation of motor 165, the timer 170 should preferably be of the time delay type to prevent it from repeating its cycle before the correcting action on the plug can be detected the vacuum gauge.

Under these conditions, the measured change in vacuum at the suction couch roll will thus cause a change in the setting of the rheostat 160 to initiate the desired correcting adjustment of the refiner plug, but owing to the time lag referred to, there might be a tendency to overcorrection or hunting by the control circuits 161 unless suitable anti-hunting provisions are made. Accordingly, an additional timer 171 is connected between the control circuits 161 and the reversing switch 70 for the plug adjusting motor, and this timer is so arranged and connected with the timer 170, that when the timer 170 completes its timed interval, it actuates the timer 171 to interrupt the circuit to the switch 70 for a predetermined timer interval of sufficient duration to permit the correcting movement of the plug to register at the vacuum gauge. If at the end of this timed out interval, the vacuum has still not returned to its desired value, the cycle will again be repeated.

It will thus be seen that this system as described in connection with Fig. 5 provides for completely automatic control over the characteristics of the stock and the web formed therefrom by coordinating the load conditions on the refiner motor with the desired vacuum conditions on the web at the suction couch roll, and this control is readily adjustable in accordance with the desired preselected vacuum and load conditions. Thus the control circuits as described in connection with Fig. 1 operate to maintain the preselected load conditions on the refiner motor, and if the vacuum conditions should change to such extent that increased or decreased refining action is required for maintaining uniformity of the web, the system automatically adjusts the preselected load conditions to compensate accordingly.

The watt sensitive relay described in connection with Figs. 1 to 5, as pointed out, provides highly desirable results in the use of the invention for installations where variations in the voltage supply or power factor are likely to occur and would affect the operation of the control system unless compensated for as described. The control unit and circuits are also well adapted for use with a current sensitive control relay, as illustrated fragmentarily in Fig. 6.

Figure 6:
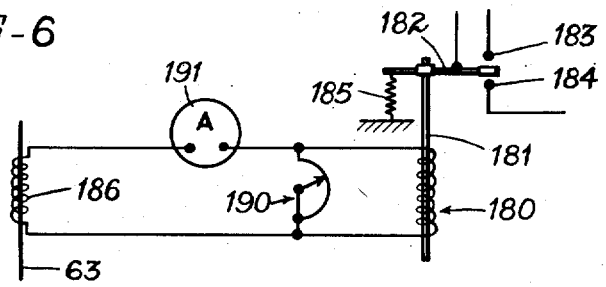
Fig. 6 is a fragment of a wiring diagram illustrating the operation of the invention in conjunction with a current sensitive control relay.

The relay 180 in Fig. 6 may be substituted for the relay 80 in Fig. 1, and it includes an armature 181 carrying a switch arm 182 movable with respect to upper and lower contacts 183 and 184 which correspond to contacts 83 and 84 respectively in Fig. 1, the armature and switch arm being provided with a balancing spring 185. The energizing coil for the relay 180 is connected by a current transformer 186 with one of the power lines for the refiner motor, shown as the line 63. A variable resistor 190 is provided for controlling the current through the coil of relay 180 in accordance with the desired input power to the refiner motor to be maintained for a given refining operation, and this circuit also includes an ammeter 191, which may be of either the indicating or recording type as desired. The operation of the system with this type of control relay is substantially the same as described in connection with Fig. 1, with the armature 181 raising or lowering the switch arm 182 as the load on the motor decreases or increases respectively.

While the forms of apparatus herein described constitute preferred embodiments fo the invention, it is to be understood that the invention is not limited to these precise forms of apparatus, and that changes may be made therein without departing from the scope of the invention which is defined in the appended claims.

What is claimed is:

1. Apparatus for adjusting the plug of a refiner comprising a housing, means for mounting said housing on said refiner, a screw journaled in said housing and including a threaded portion extending outwardly therefrom, means for operatively connecting said threaded portion of said screw to said plug to cause axial movement of said plug in response to rotation of said screw, a drive shaft for said screw in said housing, a handle for manually rotating said shaft, a motor drive for said shaft carried by said housing, and a clutch in said housing for releasably connecting said motor drive with said shaft to provide selectively for motor or manual operation of said shaft.

2. Apparatus for adjusting the plug of a refiner comprising a housing, means for mounting said housing on said refiner, a screw journaled in said housing and including a threaded portion extending outwardly therefrom, means for operatively connecting said threaded portion of said screw to said plug to cause axial movement of said plug in response to rotation of said screw, a drive shaft for rotating said screw journaled in said housing with the outer end thereof projecting through said housing, a handle on said outer end of said shaft for manually rotating said shaft, a motor drive secured to the opposite end of said housing from said handle and including a clutch member adjacent the inner end of said shaft, a complementary clutch member slidable on said shaft for selective engagement and disengagement with said first named clutch member, and an operating handle for said slidable clutch member mounted exteriorly on said housing.

3. Apparatus for adjusting the plug of a refiner comprising a housing, means for mounting said housing on said refiner, a screw journaled in said housing and including a threaded portion extending outwardly therefrom, means for operatively connecting said threaded portion of said screw to said plug to cause axial movement of said plug in response to rotation of said screw, a worm gear carried by said screw within said housing, a drive shaft journaled in said housing, a worm on said drive shaft meshing with said worm gear to rotate said screw upon rotation of said drive shaft, a handle for said drive shaft located exteriorly of said housing for manual rotation of said shaft, a motor drive for said shaft carried by said housing, and a clutch providing a selectively operable connection between said motor drive and said shaft.

4. Apparatus for adjusting the plug of a refiner having a drive motor for rotating said plug, comprising a housing, means for mounting said housing on said refiner, a screw journaled in said housing and including a threaded portion extending outwardly therefrom, means for operatively connecting said threaded portion of said screw with said plug to cause axial movement of said plug in response to rotation of said screw, a drive shaft for rotating said screw journaled in said housing, a motor drive for said shaft carried by said housing, an electrical device connected with said refiner motor for sensing the load on said motor, means for adjusting said device in accordance with a predetermined desired load condition, and an electrical connection between said device and said motor drive for actuating said drive in response to a change in said load from said desired condition.

5. Apparatus for adjusting the plug of a refiner having a drive motor and including a shell provided with supply and discharge conduits for stock, comprising a housing, means for mounting said housing on said refiner, a screw journaled in said housing and including a threaded portion extending outwardly therefrom, means for operatively connecting said threaded portion of said screw with said plug to cause axial movement of said plug in response to rotation of said screw, a drive shaft for rotating said screw journaled in said housing, a motor drive for said shaft carried by said housing, an electrical device connected with said refiner motor for sensing the load on said motor, means for adjusting said device in accordance with a predetermined desired load condition, an operative connection between said device and said motor drive for actuating said drive in response to a change in said load condition from said desired condition, a switch responsive to a predetermined stock pressure in one of said conduits, and a control operated by said switch for actuating said motor drive in the direction to withdraw said plug from said shell in response to a drop in said stock pressure below said predetermined pressure.

6. Apparatus for adjusting the plug of a refiner having a drive motor for rotating said plug, comprising a housing, means for mounting said housing on said refiner, a screw journaled in said housing and including a threaded portion extending outwardly therefrom, means for operatively connecting said threaded portion of said screw with said plug to cause axial movement of said plug in response to rotation of said screw, a drive shaft for rotating said screw journaled in said housing, a motor drive for said shaft carried by said housing, an electrical device connected with said refined motor for sensing the load on said motor, means for adjusting said device in accordance with a predetermined desired load condition, an electrical connection between said device and said motor drive for actuating said drive in response to a change in said load condition from said desired condition, and a control responsive to stoppage of said drive motor for actuating said motor drive in the direction to withdraw said plug from said shell.

7. Apparatus for adjusting the plug of a refiner having a drive motor and including a shell provided with supply and discharge conduits for stock, comprising a housing, means for mounting said housing on said refiner, a screw journaled in said housing and including a threaded portion extending outwardly therefrom, means for operatively connecting said threaded portion of said screw with said plug to cause axial movement of said plug in response to rotation of said screw, a drive shaft for rotating said screw journaled in said housing, a motor drive for said shaft carried by said housing, an electrical device connected with said refiner motor for sensing the load on said motor, means for adjusting said device in accordance with a predetermined desired load condition, an operative connection between said device and said motor drive for actuating said drive in response to a change in said load from said desired condition, a switch responsive to a predetermined stock pressure in one of said conduits, a control operated by said switch for actuating said motor drive in the direction to withdraw said plug from said shell in response to a drop in said stock pressure below said predetermined pressure, and a second control responsive to stoppage of said drive motor for actuating said motor drive in the direction to withdraw said plug from said shell.

8. In a refining system including a refiner having a drive motor for rotating a tapered plug in a shell provided with supply and discharge conduits for stock, the combination of motor operated means for effecting axial adjustment of said plug with respect to said shell, electrical means responsive to the load on said drive motor for actuating said adjusting means to maintain said load at a substantially constant predetermined value, a switch responsive to a predetermined stock pressure in one of said conduits, and an electrical control operated by said switch for actuating said adjusting means in the direction to withdraw said plug from said shell in response to a drop in said stock pressure below said predetermined pressure.

9. In a refining system including a refiner having a drive motor for rotating a tapered plug in a shell provided with supply and discharge conduits for stock, the combination of motor operated means for effecting axial adjustment of said plug with respect to said shell, electrical means responsive to the load on said drive motor for actuating said adjusting means to maintain said load at a substantially constant predetermined value, and an electrical control responsive to stoppage of said drive motor for actuating said motor drive in the direction to withdraw said plug from said shell.

10. In a refining system including a refiner having a drive motor for rotating a tapered plug in a shell provided with supply and discharge conduits for stock, the combination of motor operated means for effecting axial adjustment of said plug with respect to said shell, electrical means responsive to the load on said drive motor for actuating said adjusting means to maintain said load at a substantially constant predetermined value, a switch responsive to a predetermined stock pressure in said one of said conduits, an electrical control operated by said switch for actuating said adjusting means in the direction to withdraw said plug from said shell in response to a drop in said stock pressure below said predetermined pressure, and another electrical control responsive to stoppage of said drive motor for actuating said motor drive in the direction to withdraw said plug from said shell.

11. In a refining system including a refiner having a rotating tapered plug and a drive motor, the combination of motor operated means for effecting axial adjustment of said plug, a reversing starter controlling said motor operated adjusting means, a switch controlling said starter and including a pair of contacts and an arm movable between said contacts and a neutral position, electrical means connecting said contacts with said reversing starter for selectively actuating said starter upon engagement of said arm with one or the other said contact, a voltage coil fixed with respect to said contacts and energized in accordance with the voltage supplied to said drive motor, an armature movable with respect to said voltage coil for operating said switch arm, a current coil carried by said armature and energized in accordance with the current supplied to said drive motor for cooperation with said voltage coil to continuously determine the position of said armature with respect to said voltage coil and said switch contacts in accordance with the wattage supplied to said drive motor, and a variable resistor for adjusting the current to said current coil to predetermine the wattage supplied to said motor with said armature supporting said switch arm in said neutral position.

12. In a refining system including a refiner having a rotating tapered plug and a drive motor, the combination of motor operated means for effecting axial adjustment of said plug, a reversing starter controlling said motor operated adjusting means, a switch controlling said starter and including a pair of contacts and an arm movable between said contacts and a neutral position, electrical means connecting said contacts with said reversing starter for selectively actuating said starter upon engagement of said arm with one or the other said contact, a voltage coil fixed with respect to said contacts and energized in accordance with the voltage supplied to said drive motor, an armature movable with respect to said voltage coil for operating said switch arm, a current coil carried by said armature and energized in accordance with the current supplied to said drive motor for cooperation with said voltage coil to continuously determine the position of said armature with respect to said voltage coil and said switch contacts in accordance with the wattage supplied to said drive motor, a compensating coil for said voltage coil fixed with respect to said voltage coil and connected in series with said current coil, and a variable resistor for adjusting the current to said current coil and said compensating coil to predetermine the wattage supplied to said motor with said armature supporting said switch arm in said neutral position.

13. In a refining system including a refiner having a rotating tapered plug and a drive motor, the combination of a housing, means for mounting said housing on said refiner, a screw journaled in said housing and including a threaded portion extending outwardly therefrom, means for operatively connecting said threaded portion of said screw to said plug to cause axial movement of said plug in response to rotation of said screw, a drive shaft for rotating said screw in said housing, a handle for manually rotating said shaft, a motor drive for said shaft carried by said housing, a clutch in said housing for releasably connecting said motor drive with said shaft to provide selectively for motor or manual operation of said shaft, a reversing starter controlling said motor drive, a switch controlling said starter and including a pair of contacts and an arm movable between said contacts and a neutral position, means connecting said contacts with said reversing starter for selectively actuating said starter upon engagement of said arm with one or the other said contact, a voltage coil fixed with respect to said contacts and energized in accordance with the voltage supplied to said drive motor, an armature movable with respect to said voltage coil for operating said switch arm, a current coil carried by said armature and energized in accordance with the current supplied to said drive motor for cooperation with said voltage coil to continuously determine the position of said armature with respect to said voltage coil and said switch contacts in accordance with the wattage supplied to said drive motor, and a variable resistor for adjusting the current to said current coil to predetermine the wattage supplied to said motor with said armature supporting said switch arm in said neutral position.

14. In a refining system including a refiner having a drive motor for rotating a tapered plug in a shell, the combination of motor operated means for effecting axial adjustment of said plug with respect to said shell, means including a control relay responsive to the load on said drive motor for actuating said motor operated means to maintain said load at a substantially constant predetermined value, electrical means including a timing device for actuating said motor operated means for a predetermined time interval in the direction to withdraw said plug from said shell, and a selector switch for selectively connecting said load responsive means or said timing device means in operative relation with said motor operated means.

15. In a refining system including a refiner having a drive motor for rotating a tapered plug in a shell, the combination of motor operated means for effecting axial adjustment of said plug with respect to said shell, means including a control relay responsive to the load on said drive motor for actuating said motor operated means to maintain said load at a substantially constant predetermined value, means including switches under the control of the operator for actuating said motor operated means independently of said load responsive means, electrical means including a timing device for actuating said motor operated means for a predetermined time interval in the direction to withdraw said plug from said shell, and a selector switch for selectively connecting said load responsive means, said operator controlled means or said timing device means in operative relation with motor operated means.

16. In a paper making system including a paper making machine for forming a web, a suction couch roll for removing water from the web, a headbox delivering stock to the forming wire, a refiner having a drive motor for rotating a tapered plug in a shell, and a conduit supplying the refined stock from the refiner to the headbox, the combination of motor operated means for effecting axial adjustment of said plug with respect to said shell, an adjustable electrical control for preselecting desired load conditions on said drive motor to determine the refining action thereof in accordance with the desired characteristics of said web, electrical means responsive to the load on said drive motor for actuating said motor operated means to maintain said preselected load condition, a vacuum gauge including a member movable in response to the vacuum conditions at said couch roll, a drive for adjusting said adjustable control, and electrical means actuated by movement of said movable member for energizing said drive to cause said adjustable control to change said preselected load conditions in accordance with variations in the suction conditions at said couch roll and thereby to actuate said motor operated means through said load responsive means.

17. In a paper making system including a paper making machine for forming a web, a suction couch roll for removing water from the web, a headbox delivering stock to the forming wire, a refiner having a drive motor for rotating a tapered plug in a shell, and a conduit supplying the refined stock from the refiner to the headbox, the combination of motor operated means for effecting axial adjustment of said plug with respect to said shell, an adjustable electrical control for preselecting desired load conditions on said drive motor to determine the refining action thereof in accordance with the desired characteristics of said web, electrical means responsive to the load on said drive motor for actuating said motor operated means to maintain said preselected load condition, a vacuum gauge including a member movable in response to the vacuum conditions at said couch roll, a drive for adjusting said adjustable control, electrical means actuated by movement of said movable member for energizing said drive to cause said adjustable control to change said preselected load conditions in accordance with variations in the suction conditions at said couch roll, and a timing device connected with said energizing means for limiting the operation of said drive to a predetermined time interval providing a time lag for the change in the stock characteristics caused by the resulting adjusting movement of said plug to register on said vacuum gauge.

18. In a paper making system including a paper making machine for forming a web, a suction couch roll for removing water from the web, a headbox delivering stock to the forming wire, a refiner having a drive motor for rotating a tapered plug in a shell, and a conduit supplying the refined stock from the refiner to the headbox, the combination of motor operated means for effecting axial adjustment of said plug with respect to said shell, an adjustable electrical control for preselecting desired load conditions on said drive motor to determine the refining action thereof in accordance with the desired characteristics of said web, electrical means responsive to the load on said drive motor for actuating said motor operated means to maintain said preselected load condition, a vacuum gauge including a member movable in response to the vacuum conditions at said couch roll, a drive for adjusting said adjustable control, electrical means actuated by movement of said movable member for energizing said drive to cause said adjustable control to change said preselected load conditions in accordance with variations in the suction conditions at said couch roll, a first timing device connected with said energizing means for limiting the operation of said drive to a first predetermined time interval, and a second timing device actuated by said first timing device for preventing operation of said motor operated means for a second predetermined time interval following expiration of said first time interval providing for the change in the stock characteristics caused by the resulting adjusting movement of said plug to register on said vacuum gauge.

19. In a paper making system including a paper making machine for forming a web, a suction couch roll for removing water from the web, a headbox delivering stock to the forming wire, a refiner having a drive motor for rotating a tapered plug in a shell, and a conduit supplying the refined stock from the refiner to the headbox, the combination of a housing, means for mounting said housing on said refiner, a screw journaled in said housing and including a threaded portion extending outwardly therefrom, means operatively connecting said threaded screw portion with said plug to cause axial movement of said plug in response to rotation of said screw, a drive shaft for rotating said screw journaled in said housing, a motor drive for said shaft carried by said housing, an adjustable electrical control for preselecting desired load conditions on said drive motor to determine the refining action thereof in accordance with the desired characteristics of said web, electrical means responsive to the load on said drive motor for actuating said motor drive to maintain said preselected load condition, a vacuum gage including a member movable in response to the vacuum conditions at said couch roll, a drive for adjusting said adjustable control, and electrical means actuated by movement of said movable member for energizing said adjustable control drive to cause said adjustable control to change said preselected load conditions in accordance with variations in the suction conditions at said couch roll and thereby to actuate said motor drive through said load responsive means for effecting axial movement of said plug.

*20. Apparatus for controlling a material refiner comprising, means responsive to a condition indicative of the work output of the refiner, refiner adjusting means adapted to be controlled by said first named means, and means responsive to the refined conditions of the output of said refiner for varying the effect of said first named means.*

*21. Apparatus for controlling a refiner for paper pulp comprising, means for measuring the load on the pulp refiner, refiner adjusting means adapted to be controlled by said load measuring means, and means responsive to the freeness of the pulp for varying the action of said refiner adjusting means.*

References Cited in the file of this patent or the original patent

UNITED STATES PATENTS

| | | |
|---|---|---|
| 1,686,217 | Loman | Oct. 2, 1928 |
| 1,773,832 | Ware | Aug. 26, 1930 |
| 1,815,155 | Lewellen | July 21, 1931 |
| 1,933,814 | Lewellen | Nov. 7, 1933 |
| 2,024,424 | Bryson | Dec. 17, 1935 |